United States Patent
Agarwal et al.

(10) Patent No.: US 12,041,450 B2
(45) Date of Patent: Jul. 16, 2024

(54) COMPUTER NETWORK-BASED SERVICE FOR GENERATION AND INSTALLATION OF DIGITAL CERTIFICATES OF A PUBLIC KEY INFRASTRUCTURE SEAMLESSLY INTEGRATING WITH MULTIPLE MOBILE DEVICE MANAGEMENT SYSTEMS

(71) Applicant: Okta, Inc., San Francisco, CA (US)

(72) Inventors: Manish Agarwal, Sammamish, WA (US); Apoorva Deshpande, Milpitas, CA (US)

(*) Notice: Subject to any disclaimer, the term of this patent is extended or adjusted under 35 U.S.C. 154(b) by 318 days.

(21) Appl. No.: 17/578,376

(22) Filed: Jan. 18, 2022

(65) Prior Publication Data

US 2023/0232226 A1 Jul. 20, 2023

(51) Int. Cl.
*H04W 12/069* (2021.01)
*H04L 9/08* (2006.01)
*H04L 9/32* (2006.01)

(52) U.S. Cl.
CPC ......... *H04W 12/069* (2021.01); *H04L 9/0825* (2013.01); *H04L 9/3263* (2013.01)

(58) Field of Classification Search
CPC ...... H04W 12/06; H04W 12/069; H04L 9/08; H04L 9/0816; H04L 9/0819; H04L 9/0825; H04L 9/32; H04L 9/3263
See application file for complete search history.

(56) References Cited

U.S. PATENT DOCUMENTS

| | | | |
|---|---|---|---|
| 8,494,485 B1* | 7/2013 | Broch ................... | H04W 12/37 455/410 |
| 2007/0169093 A1* | 7/2007 | Logan ................... | H04W 12/35 717/168 |
| 2018/0139059 A1* | 5/2018 | Jaatinen ................ | H04L 9/3247 |
| 2018/0262344 A1* | 9/2018 | Broumas ................ | H04L 9/30 |
| 2019/0324419 A1* | 10/2019 | Lutz ...................... | G05B 19/0425 |
| 2021/0377054 A1* | 12/2021 | Mahajan ................ | G06F 9/455 |

* cited by examiner

*Primary Examiner* — Boris D Grijalva Lobos
(74) *Attorney, Agent, or Firm* — Holland & Hart LLP

(57) ABSTRACT

A security system used by an organization maintains a PKI used for issuing digital certificates (hereinafter for brevity also referred to simply as "certificates") and provides the PKI to the organization as a network service. In order to simplify the use of the PKI for purposes such as obtaining certificates, the security system additionally provides a mechanism for using a designated flow protocol to interface with whichever MDMs the organization uses. This mechanism permits administrators or other users to provision certificates to their organization's client devices with just a few actions within a user interface.

15 Claims, 4 Drawing Sheets

COMPUTER NETWORK-BASED SERVICE FOR GENERATION AND INSTALLATION OF DIGITAL CERTIFICATES OF A PUBLIC KEY INFRASTRUCTURE SEAMLESSLY INTEGRATING WITH MULTIPLE MOBILE DEVICE MANAGEMENT SYSTEMS

FIELD OF ART

The present invention generally relates to the field of software systems, and more specifically, to digital security for networked computing systems.

BACKGROUND

As attacks on computing systems continue to increase, digital security is more important than ever. The public key infrastructure (PKI), and the digital certificates generated and used within the PKI framework, are one of the key components for implementing robust security. Digital certificates, which associate security credentials (cryptographic public keys) with identities, provide a mechanism for reliably verifying the purported identity of a user or other entity requesting access to digital resources, such as network usage, file access, code execution, or the like.

However, implementing and maintaining the PKI needed to perform cryptographic operations, issue digital certificates, and the like, can be extremely difficult and burdensome. In consequence, an in-house PKI is not feasible for many organizations, and particularly for smaller organizations lacking sufficient technical staff.

Additionally, even when a PKI is available, its use is often notoriously difficult. Mobile Device Management (MDM) systems provide a mechanism for transferring certificates or other data onto an organization's client devices, but MDMs, too, have their own complexities of use, which adds an additional layer of difficulty for administrators of an organization, and MDMs typically do not provide a PKI. The use of certain digital certificate-related protocols can potentially lessen the degree of required manual effort to obtain certificates, but these protocols, too, are complex and add their own further difficulties for an administrator.

SUMMARY

A security system used by an organization maintains a PKI used for issuing digital certificates (hereinafter for brevity also referred to simply as "certificates") to clients and provides functionality of the PKI to the organization as a network service. In order to simplify the use of the PKI for purposes such as obtaining certificates, the security system additionally provides a mechanism for using a designated certificate exchange flow protocol to interface with whichever MDMs the organization uses. This mechanism permits administrators or other users to provision certificates to their organization's client devices (that is, issue and install the certificates) with just a few actions within a user interface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

A security system used by an organization maintains a PKI used for issuing digital certificates (hereinafter for brevity also referred to simply as "certificates"), such as X.509 certificates, and provides functionality of the PKI to the organization as a network service. In order to simplify the use of the PKI for purposes such as obtaining certificates, the security system additionally provides a mechanism for using a designated certificate exchange flow protocol to interface with whichever Mobile Device Management (MDM) systems the organization uses. This mechanism permits administrators or other users to provision certificates to their organization's client devices with just a few actions within a user interface.

Figure 1:
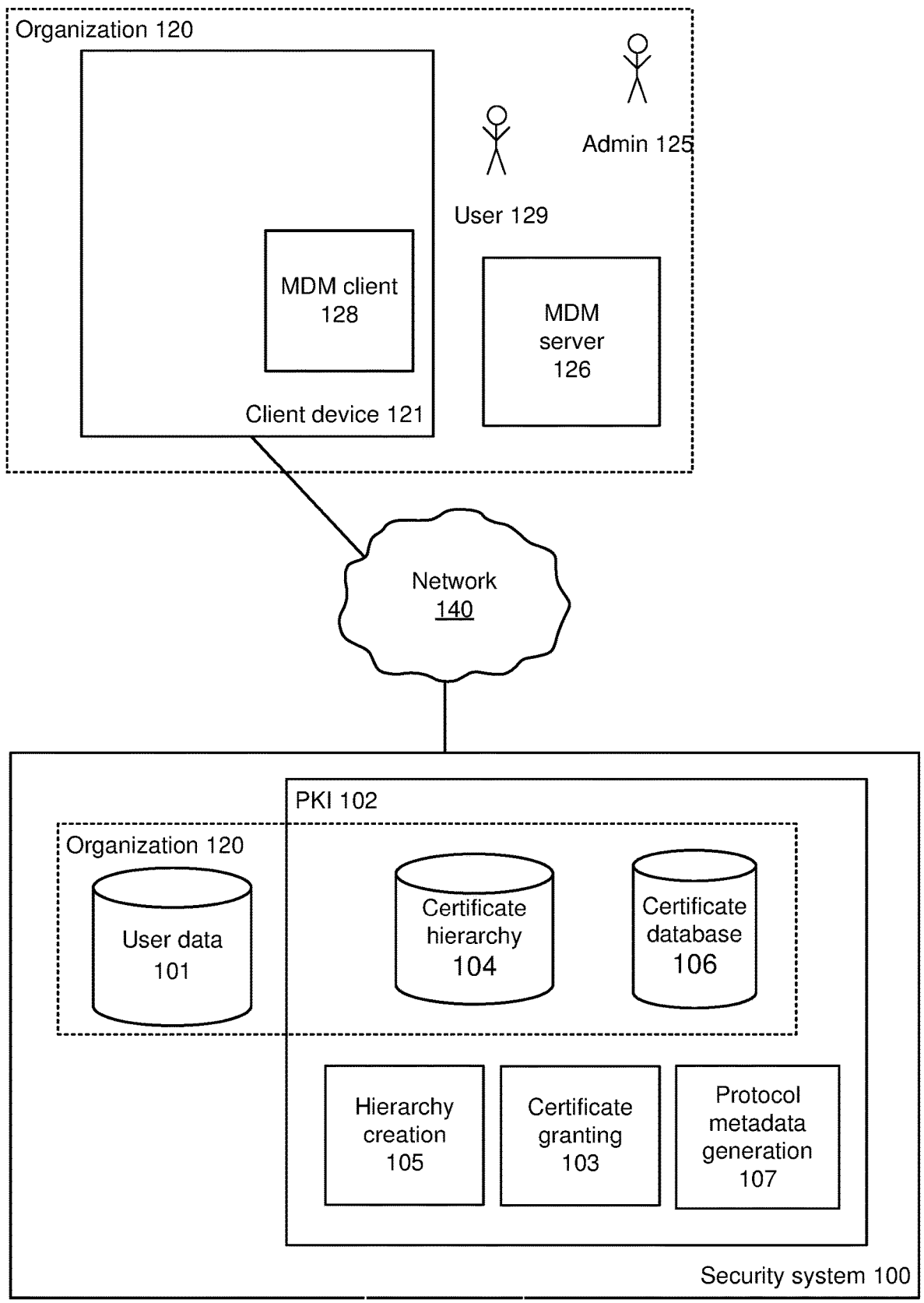
FIG. 1 illustrates one embodiment of a computing environment in which a security system provides administrators of an organization with functionality for obtaining digital certificates and installing them on client devices of users of the organization.

FIG. 1 illustrates one embodiment of a computing environment in which a security system 100 provides administrators 125 of an organization 120 with functionality for obtaining digital certificates and installing them on client devices 121 of users 129 of the organization. The users 129 may accomplish tasks on behalf of the organization using the client devices 121. These entities are now described in more detail.

The organization 120 is an entity, such as a business, a school, a governmental agency, or the like, that has a number of affiliated users 129, such as employees, contractors, or volunteers. The organization also has or integrates with one or more managed client devices 121—such as smartphones, tablet computers, laptop computers, desktop computers, or the like— that the users 129 use to perform tasks on behalf of the organization. (The client devices 121 are "managed" in the sense that for reasons of enhanced security they are administered using an MDM system, as described below.) In other embodiments, the users are not affiliated with an organization, but instead act independently using client devices 121 belonging to them.

The organization 120 uses one or more MDM systems to manage the client devices 121. An MDM system permits a host of management activities for the client devices 121, such as provisioning, updating, monitoring, troubleshooting, and the like. Some examples of possible MDM systems 126 include Microsoft™ Intune™, Jamf™, and VMware™ AirWatch™, as just some examples. Different MDM systems function differently, including providing syntaxes and accepting different data when performing their operations. The different MDM systems may also use different certificate exchange flow protocols (that is, protocols supported by a CA to enable automation of certificate provisioning), such as Jamf™ and Airwatch™ both supporting Static SCEP and Dynamic SCEP, and Intune™ supporting only Delegated SCEP.

An MDM system is made up of an MDM server 126 executing outside the bounds of the organization 120, and MDM client software 128 executing on each of the client devices 121 with which the organization intends the MDM system to be used. The MDM client software 128 can communicate with the MDM server 126 on behalf of the client device 121 to initiate any management actions previously specified by the organization 120.

The security system 100 provides security services to the organization 120. In some embodiments, the security system 100 is a multi-tenant system operated by an entity different from the organization 120, with each of many different organizations being a tenant on the security system and availing itself of the security system's security features. In other embodiments, the security system 100 only provides services to a single organization 120.

In different embodiments, the security system 100 may provide different security services to the organization 120, such as authentication and/or authorization, federated identity, and single sign-on to multiple user accounts. In particular, the security system 100 provides a public-key infrastructure (PKI) 102 that the organization 120 may access as a service, freeing the organization itself from the complexity and burden of implementing and maintaining a PKI of its own. Since a PKI includes many non-trivial operations and components and has many requirements—such as certificate issuance, CA certificate rotation upon expiration, revocation lists, ensuring strong algorithms for certificate issuance, encryption/decryption/signing/signature verification, maintaining system safety to avoid private key compromise, and the like—the ability to securely obtain PKI functionality as a service results in a substantially simplified system for the organization 120. The interoperation of multiple certificate exchange protocols (e.g., SCEP, EST, and their variants) with multiple MDM providers (e.g., Microsoft™ Intune™, Jamf™, and VMware™ AirWatch™) further simplifies the system for the organization 120.

Figure 2:
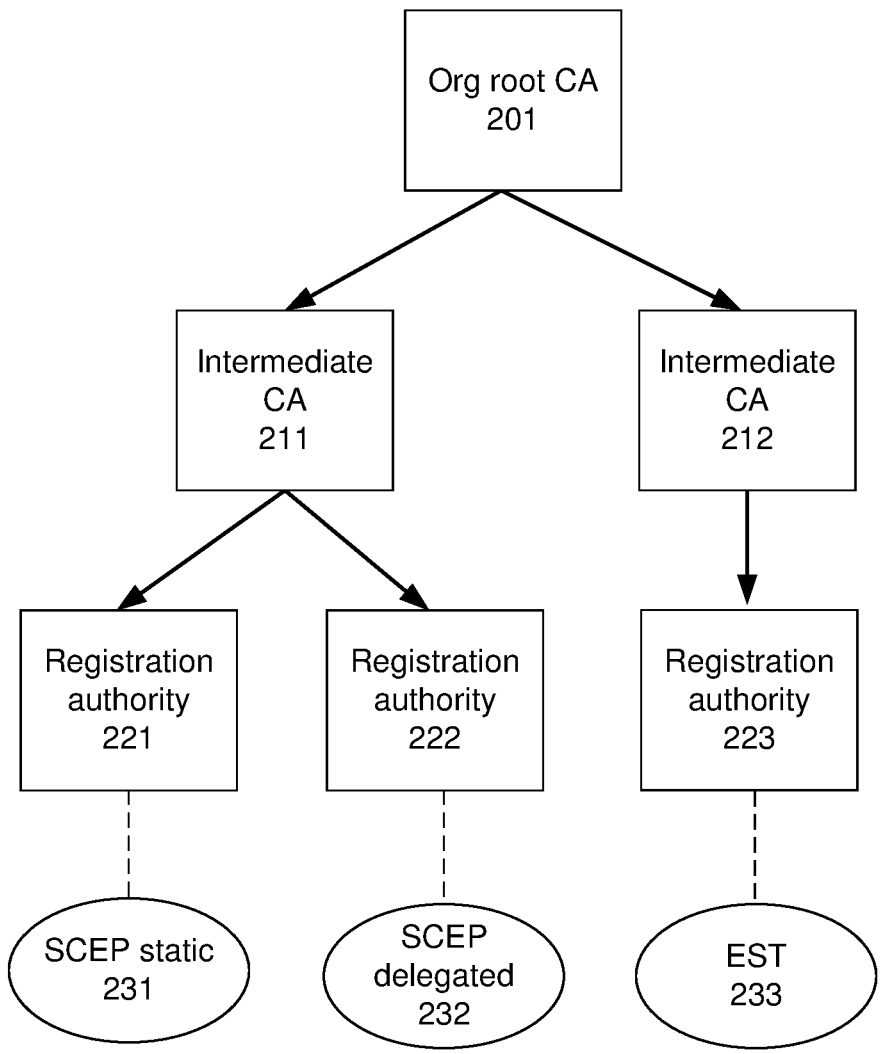
FIG. 2 illustrates one simplified example of a certificate hierarchy for one particular organization.

In some embodiments, the PKI 102 provides an organization 120 with the ability to specify its own hierarchy of trust. More specifically, in such embodiments, the PKI 102 includes a certificate hierarchy 104 and a hierarchy creation module 105 that an organization 120 can use to specify how the certificate hierarchy should be arranged. The certificate hierarchy 104 allows an arbitrary degree of complexity in the arrangement of certificates. A design that leads to a greater number of separate trust domains (as defined by separate certificates) reduces the risk that a breach of any particular domain will lead to the entire system being compromised. As a specific example of one simplified hierarchy, FIG. 2 illustrates a certificate hierarchy 104 for one particular organization 120. In the example, there is a certificate 201 for a root certification authority (CA) for the organization 120 as a whole. Under the root certificate 201 there are certificates 211, 212 for two intermediate CAs, and under the certificates for the intermediate CAs, there are certificates 221-223 for various registration authorities. Each of the registration authorities in turn has a corresponding certificate exchange flow protocol that it uses. In this example, the intermediate CAs correspond to particular functionality that the organization 120 desires be accessible to its various users 129, and the registration authorities correspond to the certificate exchange flow protocols that are available for obtaining certificates from a CA. For example, the various functionality corresponding to the intermediate CAs might be the ability to use a particular network type (e.g., WiFi, or VPN), run applications at a particular privilege level, or the like, and the possible certificate exchange flow protocols could include different variants of Simple Certificate Enrollment Protocols (SCEP) (such as Dynamic SCEP, Static SCEP, or Delegated SCEP) or Enrollment over Secure Transport (EST), or the like.

As noted, having a hierarchical structure for certificates results in more separate trust domains, which increases security. However, different embodiments may use different hierarchies than those shown in the example of FIG. 2, or need not even use a true hierarchy at all (e.g., the certificate hierarchy 104 can be a single node representing a single organization-wide certificate). The particular contents of the certificate hierarchy of an organization 120 can be specified by the organization itself by means of the hierarchy creation module 105, which accepts a request from the organization (e.g., from an administrator 125 of the organization) to add a new node to the hierarchy 104. For example, in one embodiment the hierarchy creation module 105 asks an administrator requesting creation of a new CA to specify (1) the purpose of the certificate (e.g., for WiFi, VPN, SSL authentication, or the like), (2) CA certificate attributes (e.g., common name, state, country, etc.), and (3) the certificate exchange flow protocol to define the registration authority used for that CA. The hierarchy creation module 105 then creates a node for the new CA and for its associated registration authority.

The PKI 102 includes a certificate granting module 103 that verifies identities and issues certificates to client devices 121. A client device 121 may generate a <public, private> keypair (e.g., for a discrete log or elliptic key cryptosystem) and provide the public key to the security system 100 as part of a request to issue a certificate to the client device certificate granting module. The security system 100 fulfills the request with the certificate granting module 103 of the PKI 102. In some embodiments, the certificate granting module 103 can perform validation of user identities using its knowledge about users within the user data 101. For example, the certificate granting module 103 can ensure that the user requesting certificate issuances is logged into the security system 100 as an administrator or other user with authorization to request certificates. The certificate granting module 103 can also perform validation according to the particular certificate exchange flow protocol to be used. For example, if Static SCEP is being used, the certificate issuance request can include a shared secret that the administrator had already previously shared with the security system 100, and the certificate granting module 103 can ensure that the secret in the request matches. As another example, if Dynamic SCEP is being used, the MDM system can instruct the security system 100 to generate a new secret for the client device 121 for which the certificate is to be issued; the MDM system will provide the secret to the client device; the administrator will include that secret in the certificate issuance request; and the certificate granting module 103 will ensure that only one client device receives a certificate with that secret. As yet another example, if Delegated SCEP is being used, the certificate granting module 103 will receive a secret in the certificate issuance request and use the MDM system to verify the secret. (Since the MDM system created the certificate profile and included an encrypted secret, the MDM system can also verify the secret.) If the MDM system successfully verifies the secret, then the certificate granting module 103 will issue the certificate to the client device.

The certificate granting module 103 supports one or more certificate exchange flow protocols, such as Simple Certificate Enrollment Protocols (SCEP) (e.g., Dynamic SCEP, Static SCEP, or Delegated SCEP), Enrollment over Secure Transport (EST), or the like. A certificate exchange flow protocol permits automating issuance of certificates, eliminating the need for an administrator to manually exchange information with a CA when requesting certificate issuance. A certificate exchange flow protocol is typically relatively complex to use, however, and its use for issuance of a certificate for a client device 121 requires an administrator to have knowledge of the specifics both of the certificate granting module 103 and of the MDM system that the organization 120 uses to manage the client device (e.g., to install the issued certificate on the client device).

In order to further simplify and automate the process of using the certificate exchange flow protocol(s), the PKI 102 further includes a protocol metadata generation module 107 that encapsulates information about the certificate granting module 103 into a set of metadata for carrying out the certificate exchange flow protocol. In some embodiments, the administrator will specify a particular certificate exchange flow protocol, and the protocol metadata generation module 107 will generate metadata that can be input to the MDM server 126 (e.g., by the administrator 125 using a UI of the MDM server). The particular metadata generated by the protocol metadata generation module 107 will vary depending on the particular certificate exchange flow protocol specified. For example, in some embodiments, the procedures for some of the different certificate exchange flow protocols are as follows: For Static SCEP, the administrator presses a few buttons and the metadata is generated, including a common secret and a security system PKI endpoint URL for entering into the MDM system's UI in order to configure the MDM system. For Dynamic SCEP, the situation is similar, except that the shared secret will not be generated and the administrator will receive 2 URLs: one for the MDM system to request a per-client secret (and basic authentication information), and a URL to request the certificate. For Delegated SCEP, the administrator will provide information such as an MDM URL, and how to authenticate with MDM system, and the security system 100 will provide a PKI URL that the administrator will enter into a UI of the MDM system to configure the MDM system.

Figure 3:
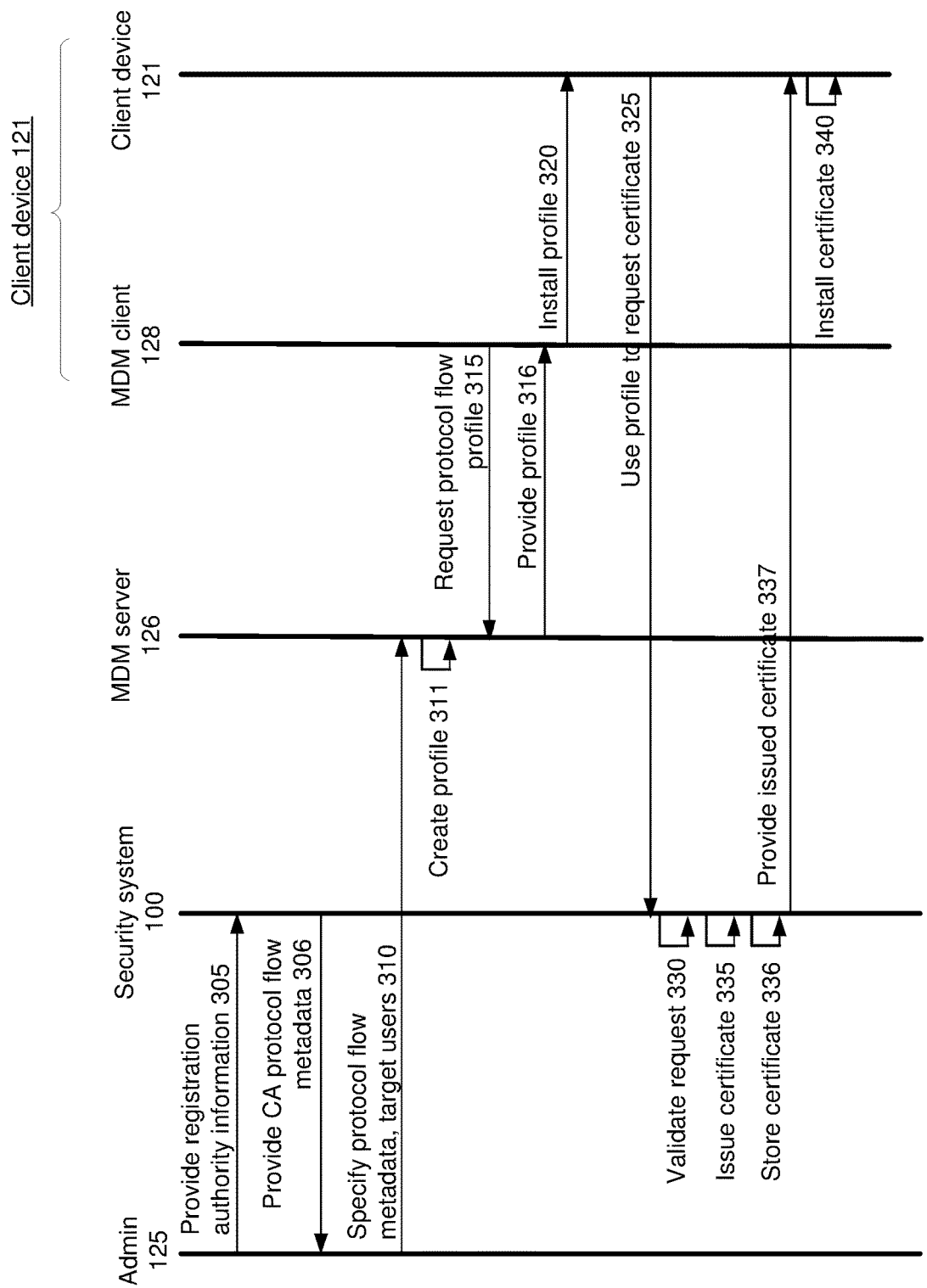
FIG. 3 illustrates the sequence of actions performed by the entities of FIG. 1 in preparation for obtaining certificates, and for subsequently obtaining the certificates for client devices, according to some embodiments.

FIG. 3 illustrates the sequence of actions performed by the entities of FIG. 1 in preparation for obtaining certificates, and for subsequently obtaining the certificates for client devices, according to some embodiments.

Before certificates are obtained, certain preliminary actions are performed. For example, the intermediate CAs and corresponding registration authorities (see, e.g., FIG. 2) are created for each organization 120 and each MDM system used by that organization. (E.g., if a particular tenant organization 120 uses two MDM systems that use Jamf, then an administrator of the organization provides MDM information once for each of the two MDM systems, and likewise the authentication system 100 creates one intermediate CA and one registration authority configuration for each of the two MDM systems. (This corresponds to steps 305-310 that result in a protocol flow profile being created, as described below.) With these preliminary actions performed, then the MDM server creates a protocol flow profile for each client device 121 that is managed by the MDM system, and each client device 121 obtains the profile and uses it to obtain a certificate. (This corresponds to steps 311-320 and 325-340, as described below.)

An administrator 125 or other authorized user of the organization 120, based on which MDM system the organization 120 uses to manage its client devices, provides 305 information that the security system 100 uses to create the appropriate CA and registration authority nodes in the certificate hierarchy 104, such as a URL of the security server 100 to which to send certificate signing requests (CSRs), and/or information describing settings of the certificate exchange protocol supported by the MDM system. This information can later be used to complete an MDM form, or to provide information to an MDM API, for creating a certificate exchange protocol configuration.

The security system 100 accordingly generates and provides 306 certificate exchange protocol flow metadata to the administrator 125, as described above with respect to the protocol metadata generation module 107.

The client device 121 of the administrator 125 accordingly specifies 310 the certificate exchange protocol flow metadata 306 to the MDM server 126. Since the MDM server 126 is used to control the transfer of data to the managed client devices 121, specifying the metadata to the MDM server 126 provides the MDM server 126 with the information needed to accomplish the certificate issuance and installation. The administrator 125 may specify the metadata to the MDM server 126 using a user interface, or an API, provided by the MDM server. As noted above, the precise metadata that is specified depends upon the certificate exchange flow protocol that is selected. The MDM server 126 accordingly creates 311 a certificate exchange flow protocol profile, which specifies details such as which hash algorithm to use, which endpoint to call to obtain a certificate, the expiration date or length of the certificate, the amount of time before certificate renewal, and whether the certificate corresponds to the client device as a whole, or to a specific user on the client device. The administrator 125 also specifies 310 a set of target users 129 (e.g., as a set of individual user IDs, with an ID of a group including the users, or by other means) to whom the certificate is to be issued.

In some "pull"-based embodiments, the MDM client software 128 running on the managed client device 121 periodically polls the MDM server 126 to see whether there are any additional certificate exchange protocol flow profiles to be installed on the managed client device. This effectively requests 315 the certificate exchange protocol flow profile, and the MDM server 126 accordingly provides 316 the new profile to the MDM client software 128, which installs 320 the profile locally on the client device 121. In other "push"-based embodiments, the MDM server 126 directly provides the profile to the MDM client 128 software.

With the certificate exchange protocol flow profile obtained, the client device 121 (e.g., an OS management subsystem, or the MDM client software 128) uses the profile to request 325 the issuance of a certificate for a client device from the certificate granting authority 103 on the security system 100. In some embodiments, the request 325 for certificate issuance is generated in response to actions of the administrator, such as use of a user interface, or execution of command-line or other instructions, to indicate the request.

The certificate granting module 103 can validate 330 the request, such as (in the case of Static SCEP) ensuring that the shared secret in the request matches a secret previously shared with the security system. If the request is properly validated, the certificate granting module 103 issues 335 the certificate for the managed client device 121, as described above with respect to FIG. 1. The certificate granting module 103 may also cause the issued certificate to be stored 336 within a certificate database 106, so that an administrator may later view the certificate and take actions on the certificate, such as suspending it, revoking it, or seeing its degree of usage. The certificate granting module 103 provides 337 the issued certificate back to the MDM client software 128 of the client device 121, which installs 340 the certificate locally for future use when requesting services of entities that recognize certificates issued by the certificate granting module 103.

With certificates installed on managed client devices 121, those devices can use the certificates to identify themselves when requesting another entity (such as a resource server within the organization 120) to provide a resource or service. For example, to communicate with the organization 120 over a VPN, a client device could communicate with the organization to request establishment of a VPN connection, including a signature created using the private key of its certificate from an intermediate CA corresponding to VPN usage. The organization 120 could delegate to the PKI 102 of the security system 100 to ensure that the certificate is valid, and if so, create a VPN connection for communication with the client device 121.

In some embodiments, the security system 100 includes single sign-on (SSO) functionality that allows the security system to transparently log a user in to the different accounts or other resources to which the user has access. For example, for a given user who has logged in to the security system 100, the security system can look up the user's accounts or other resources within the user data 101, as well as the user's credentials for those accounts. Using the credentials, as well as metadata or other information about the accounts, security system 100 can automatically log the user into the applications or other resources described in the user data 101, such as by establishing application sessions with the various applications and providing corresponding session data (e.g., session tokens) to the device 121. Thus, with a single login to the security system 100, the SSO functionality of the security system provides a user with automatic access to all the user's accounts or other resources.

Physically, the organization 120 is made up of a number of computing systems, including the various client devices 121; one or more internal networks that connects the computing systems, including routers or other networking devices that define the boundary between the organization and external networks; and the like.

Similarly, the security system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 4:
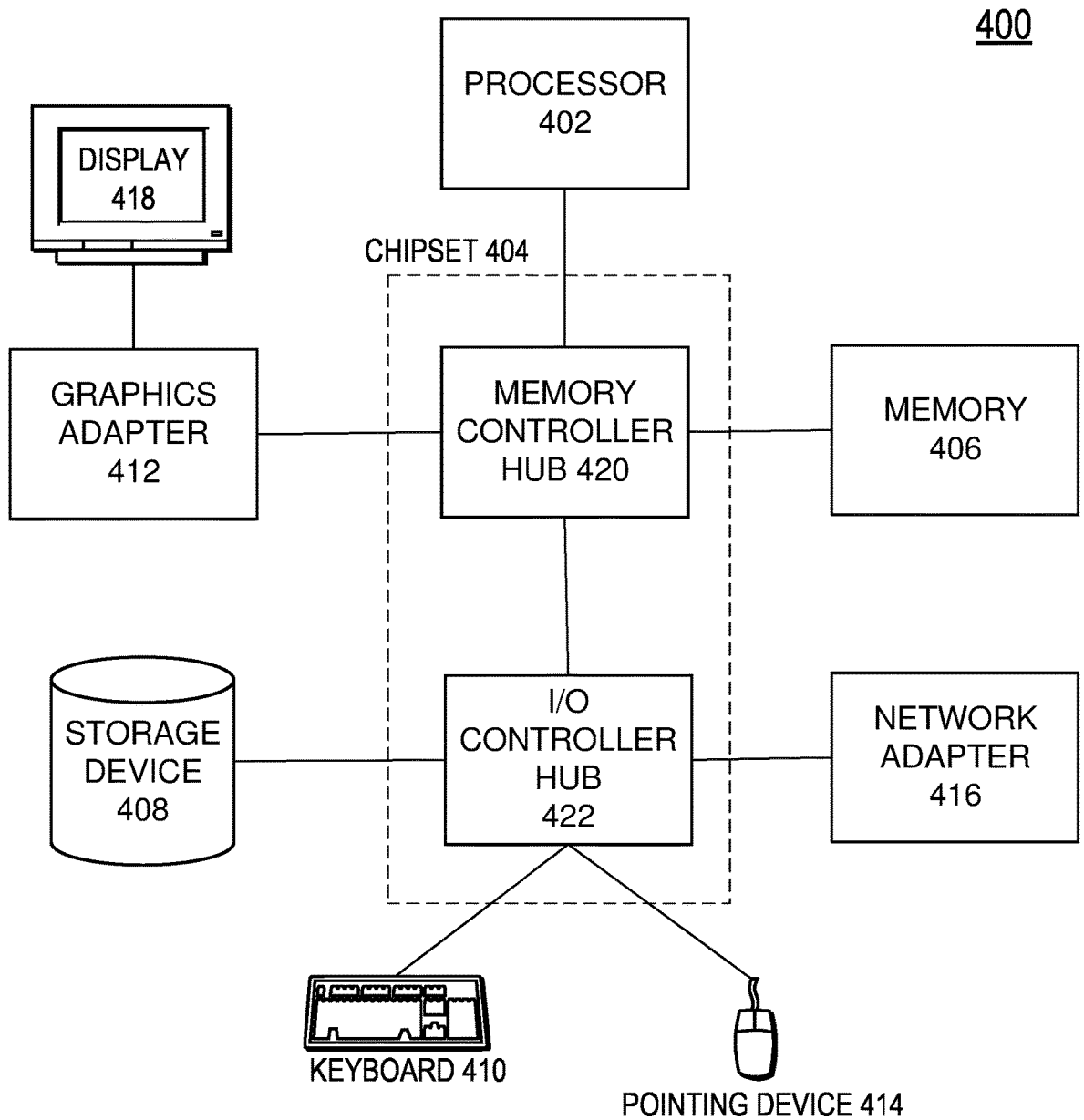
FIG. 4 is a high-level block diagram illustrating physical components of a computer used as part or all of (for example) the security system, the client device, and/or the MDM server of FIG. 1, according to one embodiment.

FIG. 4 is a high-level block diagram illustrating physical components of a computer 400 used as part or all of (for example) the security system 100, the client device 121, and/or the MDM server 126, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard 410 or pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method performed by a security system for provisioning managed client devices of an organization with digital certificates, the computer-implemented method comprising:
   receiving, from a user of the organization, information indicating a certificate exchange protocol used to issue the digital certificates, the certificate exchange protocol used by a mobile device management (MDM) system used by the organization;
   returning, to the user of the organization, certificate exchange protocol flow metadata for the certificate exchange protocol, the certificate exchange protocol flow metadata containing specifics of the security system; and
   subsequent to the user of the organization providing the certificate exchange protocol flow metadata to the MDM system:
      receiving a request according to a certificate exchange protocol flow profile generated using the certificate exchange protocol flow metadata to issue a digital certificate for a first client device of the organization;
      generating the digital certificate for the first client device; and
      providing the digital certificate to the first client device, wherein the first client device provides the digital certificate as part of future requests for usage of resources of the organization.

2. The computer-implemented method of claim 1, wherein the certificate exchange protocol flow metadata comprises a URL for the MDM system for configuring the certificate exchange protocol.

3. The computer-implemented method of claim 1, wherein the certificate exchange protocol flow metadata comprises a shared secret.

4. The computer-implemented method of claim 1, wherein the certificate exchange protocol is Simple Certificate Enrollment Protocol (SCEP).

5. The computer-implemented method of claim 1, wherein the request is received from the first client device.

6. A non-transitory computer-readable storage medium storing instructions that when executed by a computer processor of a security system perform actions comprising:
   receiving, from a user of an organization, information indicating a certificate exchange protocol used to issue digital certificates, the certificate exchange protocol used by a mobile device management (MDM) system used by the organization;
   returning, to the user of the organization, certificate exchange protocol flow metadata for the certificate exchange protocol, the certificate exchange protocol flow metadata containing specifics of a security server; and
   subsequent to the user of the organization providing the certificate exchange protocol flow metadata to the MDM system:
      receiving a request according to a certificate exchange protocol flow profile generated using the certificate exchange protocol flow metadata to issue a digital certificate for a first client device of the organization;
      generating the digital certificate for the first client device; and
      providing the digital certificate to the first client device, wherein the first client device provides the digital certificate as part of future requests for usage of resources of the organization.

7. The non-transitory computer-readable storage medium of claim 6, wherein the certificate exchange protocol flow metadata comprises a URL for the MDM system for configuring the certificate exchange protocol.

8. The non-transitory computer-readable storage medium of claim 6, wherein the certificate exchange protocol flow metadata comprises a shared secret.

9. The non-transitory computer-readable storage medium of claim 6, wherein the certificate exchange protocol is Simple Certificate Enrollment Protocol (SCEP).

10. The non-transitory computer-readable storage medium of claim 6, wherein the request is received from the first client device.

11. A security system for provisioning managed client devices of an organization with digital certificates comprising:
 a computer processor; and
 a non-transitory computer-readable storage medium storing instructions that when executed by the computer processor perform actions comprising:
  receiving, from a user of the organization, information indicating a certificate exchange protocol used to issue the digital certificates, the certificate exchange protocol used by a mobile device management (MDM) system used by the organization;
  returning, to the user of the organization, certificate exchange protocol flow metadata for the certificate exchange protocol, the certificate exchange protocol flow metadata containing specifics of a security server; and
  subsequent to the user of the organization providing the certificate exchange protocol flow metadata to the MDM system:
   receiving a request according to a certificate exchange protocol flow profile generated using the certificate exchange protocol flow metadata to issue a digital certificate for a first client device of the organization;
   generating the digital certificate for the first client device; and
   providing the digital certificate to the first client device,
   wherein the first client device provides the digital certificate as part of future requests for usage of resources of the organization.

12. The security system of claim 11, wherein the certificate exchange protocol flow metadata comprises a URL for the MDM system for configuring the certificate exchange protocol.

13. The security system of claim 11, wherein the certificate exchange protocol flow metadata comprises a shared secret.

14. The security system of claim 11, wherein the certificate exchange protocol is Simple Certificate Enrollment Protocol (SCEP).

15. The security system of claim 11, wherein the request is received from the first client device.

* * * * *